(12) United States Patent
Singh et al.

(10) Patent No.: US 12,450,176 B2
(45) Date of Patent: Oct. 21, 2025

(54) SYSTEM AND METHOD FOR SECURING INDIRECT MEMORY ACCESSES

(71) Applicant: NXP B.V., Eindhoven (NL)

(72) Inventors: Vivek Singh, Noida (IN); Nikhil Tiwari, New Delhi (IN); Vishal Gulati, New Delhi (IN)

(73) Assignee: NXP B.V., Eindhoven (NL)

( * ) Notice: Subject to any disclaimer, the term of this patent is extended or adjusted under 35 U.S.C. 154(b) by 100 days.

(21) Appl. No.: 18/049,683

(22) Filed: Oct. 26, 2022

(65) Prior Publication Data

US 2024/0078191 A1 Mar. 7, 2024

(30) Foreign Application Priority Data

Sep. 1, 2022 (IN) .............................. 202221050049

(51) Int. Cl.
*G06F 12/00* (2006.01)
*G06F 12/14* (2006.01)

(52) U.S. Cl.
CPC ...... *G06F 12/1441* (2013.01); *G06F 12/1483* (2013.01); *G06F 12/1491* (2013.01)

(58) Field of Classification Search
CPC .. G06F 12/14; G06F 12/1408; G06F 12/1416; G06F 12/1425; G06F 12/1433; G06F 12/1441; G06F 12/145; G06F 12/1458; G06F 12/1466; G06F 12/1475; G06F 12/1483; G06F 12/1491; G06F 21/30
See application file for complete search history.

(56) References Cited

U.S. PATENT DOCUMENTS

| | | | |
|---|---|---|---|
| 8,190,919 B2 | 5/2012 | Natarajan et al. | |
| 11,256,830 B2 | 2/2022 | Jiang et al. | |
| 11,366,940 B2 | 6/2022 | Dekens | |
| 2016/0147672 A1* | 5/2016 | Atzmon | G06F 12/1441 711/163 |
| 2019/0361616 A1* | 11/2019 | Jiang | G06F 12/1441 |
| 2019/0384937 A1* | 12/2019 | Jiang | G06F 12/145 |
| 2021/0234708 A1* | 7/2021 | Van Antwerpen | G06F 3/0644 |

* cited by examiner

*Primary Examiner* — Arvind Talukdar

(57) ABSTRACT

An integrated circuit (IC), including a functional circuit and a security system, is disclosed. The functional circuit generates a request packet for an indirect memory access of a memory. The security system validates the functional circuit based on a security attribute and a functional identifier of the functional circuit. Based on the request packet and the validation of the functional circuit, the security system identifies an instruction sequence associated with the indirect memory access. Further, the security system determines a type of the indirect memory access based on the instruction sequence, and validates the type of the indirect memory access based on the security attribute and the request packet. Based on the validation of the type of the indirect memory access, the instruction sequence is executed, thereby facilitating the indirect memory access for the functional circuit.

19 Claims, 9 Drawing Sheets

SYSTEM AND METHOD FOR SECURING INDIRECT MEMORY ACCESSES

CROSS-REFERENCE TO RELATED APPLICATIONS

This patent application makes reference to, claims priority to, and claims the benefit of IN Provisional Application No. 202221050049, filed Sep. 1, 2022, the contents of which are incorporated by reference herein.

FIELD OF USE

The present disclosure relates generally to electronic circuits, and, more particularly, to a system and a method for securing indirect memory accesses.

BACKGROUND

Memories (e.g., flash memories) are widely used in electronic devices such as automotive devices, network devices, or the like. Typically, access to a memory is controlled by a memory controller. In such cases, a functional circuit requiring the access may generate an access request that includes information associated with the access (e.g., an address, an access type, or the like), and store the access request in a register associated with the memory controller. Based on the stored access request, the memory controller may execute a memory operation (e.g., read, write, erase, or the like) on the memory. Such an access is referred to as an indirect memory access. Generally, the memory controller executes the memory operation sans any validation of the access request, thereby rendering the indirect memory access insecure. As a result, the memory may be susceptible to corruption.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
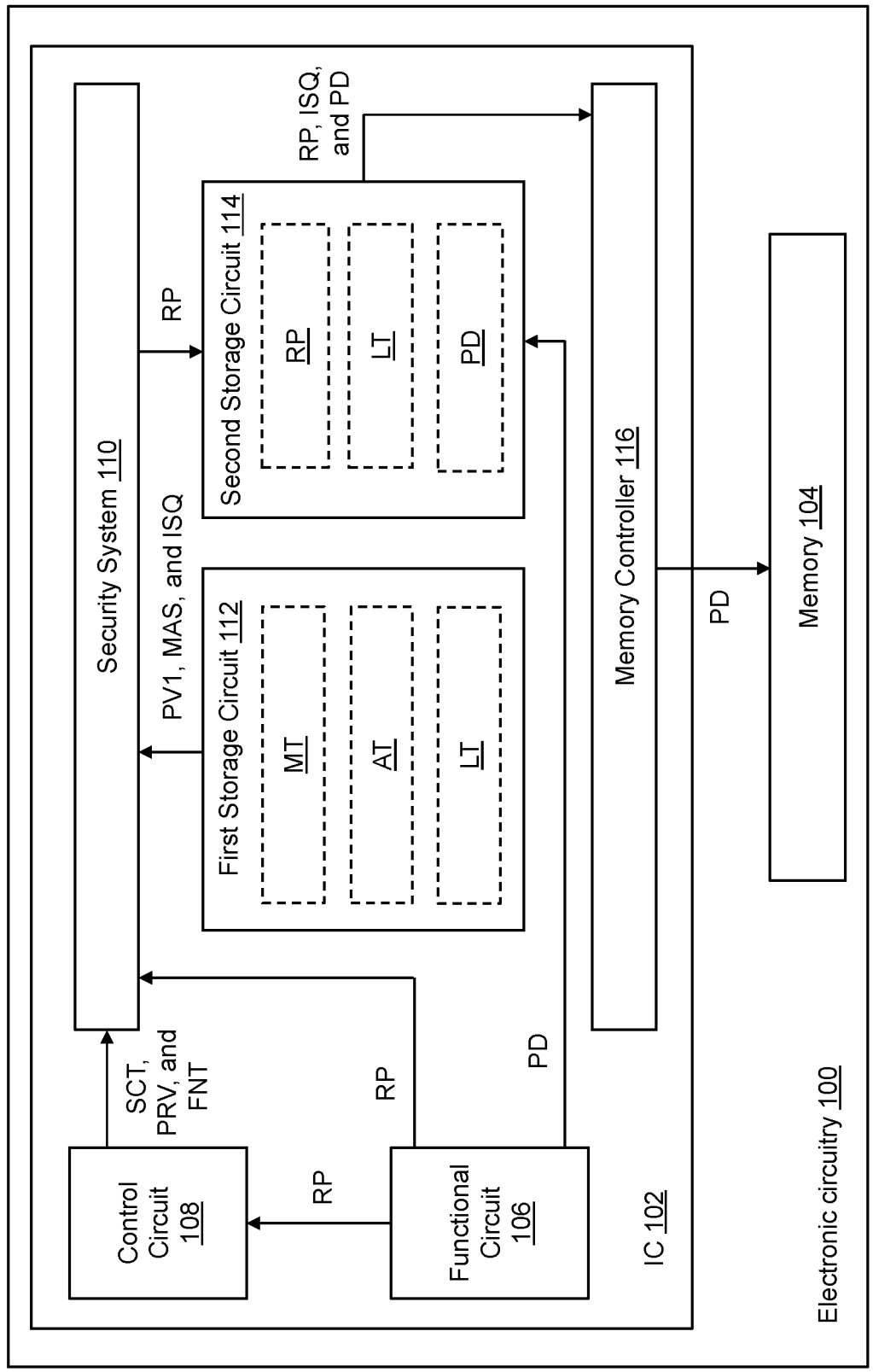
FIG. 1 illustrates a schematic block diagram of electronic circuitry in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, an integrated circuit (IC) is disclosed. The IC may include a functional circuit and a security system that may be coupled to the functional circuit. The functional circuit may be configured to generate a request packet for an indirect memory access of a memory. The security system may be configured to receive the request packet, a functional identifier (ID) of the functional circuit, and a security attribute indicative of a security level of the functional circuit. The security system may be further configured to validate the functional circuit based on the security attribute and the functional ID. Based on the request packet and the validation of the functional circuit, the security system may be further configured to identify an instruction sequence associated with the indirect memory access. Further, the security system may be configured to determine a type of the indirect memory access based on the instruction sequence and validate the type of the indirect memory access based on the security attribute and the request packet. Based on the validation of the type of the indirect memory access, the instruction sequence is executed, thereby facilitating the indirect memory access for the functional circuit.

In another embodiment of the present disclosure, a method for securing an indirect memory access of a memory is disclosed. The method may include generating a request packet by a functional circuit of an IC for the indirect memory access of the memory. The method may further include receiving the request packet, a functional ID of the functional circuit, and a security attribute indicative of a security level of the functional circuit, by a security system of the IC. Further, the method may include validating the functional circuit by the security system based on the security attribute and the functional ID. The method may additionally include identifying an instruction sequence associated with the indirect memory access and determining a type of the indirect memory access based on the instruction sequence by the security system. The instruction sequence is identified based on the request packet and the validation of the functional circuit. The method may further include validating, by the security system, the type of the indirect memory access based on the security attribute and the request packet. Based on the validation of the type of the indirect memory access, the instruction sequence is executed, thereby facilitating the indirect memory access for the functional circuit.

In some embodiments, to validate the functional circuit, the security system may be further configured to compare the security attribute with a set of security levels associated with authorized access of the memory, and compare the functional ID with a set of functional IDs associated with the authorized access of the memory. The functional circuit is validated based on a match between the security attribute and one of the set of security levels and a match between the functional ID and one of the set of functional IDs.

In some embodiments, the IC may further include a first storage circuit that may be configured to store a look-up table. The look-up table may include a plurality of rows indicative of a plurality of instruction sequences. The request packet may include a sequence ID that is indicative of an address associated with the look-up table. The security system may be further configured to compare the sequence ID with a plurality of addresses of the plurality of rows.

Further, the instruction sequence may be identified based on a match between the sequence ID and one of the plurality of addresses.

In some embodiments, the security system may be further configured to receive a privilege attribute indicative of a privilege level of the functional circuit. The security system may validate the type of the indirect memory access further based on the privilege attribute.

In some embodiments, the IC may further include a control circuit that may be coupled to the functional circuit and the security system. The control circuit may be configured to receive the request packet from the functional circuit and determine the security attribute, the privilege attribute, and the functional ID of the functional circuit based on the request packet. Further, the control circuit may be configured to provide the security attribute, the privilege attribute, and the functional ID to the security system.

In some embodiments, the security system may be further configured to determine, based on the request packet, whether the indirect memory access corresponds to at least one of a group consisting of an atomic operation and a data transfer operation.

In some embodiments, when the indirect memory access corresponds to the data transfer operation, to validate the type of the indirect memory access, the security system may be further configured to determine a plurality of addresses associated with the indirect memory access. The request packet may include a start address and a data size associated with the indirect memory access, and the plurality of addresses is determined based on the start address and the data size. The security system may be further configured to determine whether one of a plurality of address ranges includes the plurality of addresses. Each address range of the plurality of address ranges may include one or more addresses associated with the memory. Further, the plurality of address ranges is mapped to a plurality of policy values. From the plurality of policy values, the security system may be further configured to identify, based on the determination that a first address range of the plurality of address ranges includes the plurality of addresses, a first policy value associated with the first address range. Further, the security system may be configured to determine a set of indirect memory access types authorized for the functional circuit based on the first policy value, the security attribute, and the privilege attribute, and compare the type of the indirect memory access with the set of indirect memory access types to validate the type of the indirect memory access.

In some embodiments, the first storage circuit may be further configured to store an address range table that indicates the mapping between the plurality of address ranges and the plurality of policy values. The security system may be further configured to access the address range table to determine that the first address range includes the plurality of addresses and to identify the first policy value associated with the first address range. The plurality of address ranges is mutually exclusive.

In some embodiments, the first storage circuit may be further configured to store a memory access table that indicates a mapping between the plurality of policy values, a plurality of security levels, a plurality of privilege levels, and a plurality of indirect memory access types. Each policy value of the plurality of policy values is indicative of one or more indirect memory access types associated with a combination of one of the plurality of security levels and one of the plurality of privilege levels. The security system may be further configured to compare the first policy value with each of the plurality of policy values, compare the security attribute of the functional circuit with each of the plurality of security levels, and compare the privilege attribute of the functional circuit with each of the plurality of privilege levels. The set of indirect memory access types is determined based on a match between the first policy value and one of the plurality of policy values, a match between the security attribute of the functional circuit and one of the plurality of security levels, and a match between the privilege attribute of the functional circuit and one of the plurality of privilege levels.

In some embodiments, when the indirect memory access corresponds to the atomic operation, to validate the type of the indirect memory access, the security system may be further configured to identify a first policy value associated with the atomic operation. Further, the security system may be configured to determine a set of indirect memory access types authorized for the functional circuit based on the first policy value, the security attribute, and the privilege attribute. The security system may be further configured to compare the type of the indirect memory access with the set of indirect memory access types to validate the type of the indirect memory access.

In some embodiments, the plurality of instruction sequences may include a first set of instruction sequences corresponding to the data transfer operation and a second set of instruction sequences corresponding to the atomic operation. When the indirect memory access corresponds to the data transfer operation, the security system may be further configured to determine whether the identified instruction sequence matches one of the first set of instruction sequences such that the type of the indirect memory access is validated based on a match between the identified instruction sequence and one of the first set of instruction sequences. Further, when the indirect memory access corresponds to the atomic operation, the security system may be configured to determine whether the identified instruction sequence matches one of the second set of instruction sequences such that the type of the indirect memory access is validated based on a match between the identified instruction sequence and one of the second set of instruction sequences.

In some embodiments, the IC may further include a second storage circuit that may be coupled to the security system, and a memory controller that may be coupled to the second storage circuit and the memory. Based on the validation of the type of the indirect memory access, the security system may be further configured to store the request packet in the second storage circuit. The memory controller may be configured to retrieve the request packet from the second storage circuit, identify the instruction sequence associated with the indirect memory access based on the request packet, and execute the instruction sequence on the memory.

In some embodiments, the second storage circuit may be further configured to store the look-up table. The memory controller may be further configured to compare the sequence ID with the plurality of addresses of the plurality of rows of the look-up table such that the instruction sequence is identified based on a match between the sequence ID and one of the plurality of addresses.

In some embodiments, the memory controller may be further configured to determine a plurality of addresses associated with the indirect memory access based on the start address and the data size included in the request packet. The instruction sequence is executed on the plurality of addresses of the memory.

In some embodiments, the indirect memory access may correspond to a write operation. The security system may be further configured to receive, based on the validation of the type of the indirect memory access, the functional ID and packet data associated with the write operation. Based on the functional ID, the security system may be further configured to validate the functional circuit for the write operation. Based on the validation of the functional circuit for the write operation, the functional circuit may be further configured to write the packet data to the second storage circuit. Further, the memory controller may be configured to retrieve the packet data from the second storage circuit and write the packet data to the memory.

Conventionally, to secure indirect memory accesses of a memory, a security system, that validates each access request generated by a functional circuit, is utilized. In such cases, memory operations associated with exclusively the validated access requests are executed on the memory. The security system validates each access request based on an associated address. For example, a set of permitted access types (e.g., a write access type, a read access type, or the like) is defined for each address of the memory. To validate an access request, the security system determines whether an access type associated with the access request matches one of the set of permitted access types for the corresponding address. Typically, one access request is generated to access a single address. As a result, when multiple addresses are to be accessed, the functional circuit is required to generate multiple access requests, thereby degrading the availability of the functional circuit. Additionally, the degree of security provided by such a security system is limited as the security system may validate an access request from a malicious functional circuit as long as the requested access type matches one of the permitted access types. As a result, the memory remains susceptible to corruption.

Various embodiments of the present disclosure disclose an integrated circuit (IC) that includes a functional circuit, a security system, and a memory controller. The IC may be coupled to a memory. The functional circuit may generate a request packet for an indirect memory access of the memory. The security system may receive the request packet from the functional circuit. The request packet may include a start address, a data size, and a sequence identifier (ID) associated with the indirect memory access. Additionally, the security system may receive a functional ID, a security attribute, and a privilege attribute of the functional circuit. The security and privilege attributes may be indicative of security and privilege levels of the functional circuit, respectively. The security system may validate the functional circuit based on the security attribute and the functional ID. When the functional circuit is validated, the security system may determine, based on the sequence ID, an instruction sequence associated with the indirect memory access. Further, the security system may determine a type of the indirect memory access based on the instruction sequence and validate the type of the indirect memory access based on the security attribute, the privilege attribute, the start address, the data size, and the sequence ID. Based on the validation of the type of the indirect memory access, the memory controller may execute the instruction sequence on the memory, thereby facilitating the indirect memory access for the functional circuit.

In the present disclosure, the indirect memory access is secured by validating not only an access request (e.g., the request packet) but also the functional circuit requesting the indirect memory access. Thus, exclusively the authorized types of indirect memory accesses requested by the authorized functional circuits are executed on the memory. As a result, the degree of security provided by the security system of the present disclosure is significantly greater than that provided by a conventional security system. Further, the memory of the present disclosure is less susceptible to corruption as compared to a memory whose accesses are secured by the conventional security system. Additionally, as one request packet is associated with an instruction sequence, multiple addresses are accessed based on the validation of a single request packet. Consequently, the availability of the functional circuit of the present disclosure is significantly greater than that of a functional circuit associated with the conventional security system.

FIG. 1 illustrates a schematic block diagram of electronic circuitry 100 in accordance with an embodiment of the present disclosure. The electronic circuitry 100 may include an integrated circuit (IC) 102 and a memory 104 that may be coupled to the IC 102. The electronic circuitry 100 may be included in various devices such as automotive devices, network devices, mobile devices, or the like. In an embodiment, the electronic circuitry 100 corresponds to a printed circuit board.

The memory 104 may correspond to an external memory of the IC 102. Examples of the memory 104 may include a flash memory, an electrically erasable programmable read-only memory, or the like. The IC 102 may access the memory 104 to perform various operations (e.g., a read operation, a write operation, an erase operation, or the like). The access may correspond to an indirect memory access. For indirect memory accesses, functional circuits requesting the access may trigger memory operations at memory controllers of the memories, and the memory controllers may then execute the triggered memory operations on the memories. The IC 102 may include a functional circuit 106, a control circuit 108, a security system 110, a first storage circuit 112, a second storage circuit 114, and a memory controller 116.

The functional circuit 106 may include suitable circuitry that may be configured to perform one or more operations. For example, the functional circuit 106 may be configured to initiate the indirect memory access of the memory 104. The indirect memory access may correspond to a data transfer operation or an atomic operation (e.g., an operation that does not require data transfer). Examples of the atomic operation may include a chip erase operation, a block erase operation, a power-down operation, or the like. Examples of the data transfer operation may include a read operation, a write operation, or the like.

The functional circuit 106 may be further configured to generate a request packet RP for the indirect memory access. The request packet RP may include a start address, a data size, and a sequence identifier (ID) associated with the indirect memory access. The start address may indicate one location of the memory 104, whereas the data size may indicate a size of a data payload to be written to or read from the memory 104 (e.g., a number of consecutive addresses, from the start address, that are to be accessed for the indirect memory access). Value of the data size may be null for the atomic operation and non-zero for the data transfer operation. On the other hand, value of the start address may be null or non-zero for the atomic operation and non-zero for the data transfer operation. Further, the sequence ID may be utilized for determining a type (e.g., a write access type or a read access type) of the indirect memory access. Additionally, when the data transfer operation corresponds to the write operation, the functional circuit 106 may be configured to generate packet data PD for writing to the memory 104. The data payload (e.g., the packet data PD) may be absent for the atomic operation.

The functional circuit 106 and the type of the indirect memory access are validated, and exclusively based on the successful validation, the associated atomic or data transfer operation is executed on the memory 104. When the indirect memory access corresponds to the write operation, the packet data PD may be written to the memory 104. In such a scenario, the functional circuit 106 may be further configured to receive a first acknowledgment (not shown) indicative of the successful execution of the write operation. Similarly, when the indirect memory access corresponds to the read operation, the functional circuit 106 may be further configured to receive reference data (not shown) that may be read from the memory 104. Further, when the indirect memory access corresponds to the atomic operation, the functional circuit 106 may be configured to receive a second acknowledgment (not shown) indicative of the successful execution of the atomic operation. Examples of the functional circuit 106 may include processors, advanced extensible interface (AXI) master circuits, or the like.

The control circuit 108 may be coupled to the functional circuit 106 and the security system 110. The control circuit 108 may include suitable circuitry that may be configured to perform one or more operations. For example, the control circuit 108 may be configured to receive the request packet RP from the functional circuit 106. Based on the request packet RP, the control circuit 108 may be further configured to determine a security attribute SCT, a privilege attribute PRV, and a functional ID FNT of the functional circuit 106. The security attribute SCT may be indicative of a security level of the functional circuit 106. In an example, the security level corresponds to a secure level or a non-secure level. Similarly, the privilege attribute PRV may be indicative of a privilege level of the functional circuit 106. In an example, the privilege level corresponds to a high-privilege level or a low-privilege level. Further, the control circuit 108 may be configured to provide the security attribute SCT, the privilege attribute PRV, and the functional ID FNT to the security system 110.

The security system 110 may be coupled to the functional circuit 106, the control circuit 108, the first storage circuit 112, and the second storage circuit 114. The security system 110 may include suitable circuitry that may be configured to perform one or more operations. For example, the security system 110 may be configured to receive the request packet RP from the functional circuit 106. The security system 110 may be further configured to receive the functional ID FNT, the security attribute SCT, and the privilege attribute PRV of the functional circuit 106 from the control circuit 108. The security system 110 may include a queue (not shown) to store the request packet RP, the functional ID FNT, the security attribute SCT, and the privilege attribute PRV.

The security system 110 may be further configured to validate the functional circuit 106 for the indirect memory access. The functional circuit 106 may be validated based on the security attribute SCT and the functional ID FNT. To validate the functional circuit 106, the security system 110 may perform various operations. For example, the security system 110 may be further configured to compare the security attribute SCT of the functional circuit 106 with a set of security levels associated with authorized access of the memory 104 (e.g., security levels of a first set of functional circuits (not shown) that is authorized to access the memory 104). The set of security levels may correspond to the secure level, the non-secure level, or a combination thereof. Further, the security system 110 may be configured to compare the functional ID FNT with a set of functional IDs associated with the authorized access of the memory 104 (e.g., functional IDs of a second set of functional circuits (not shown) that is authorized to access the memory 104). In an embodiment, the set of security levels and the set of functional IDs may be stored in a buffer (not shown) associated with the security system 110, and the security system 110 may be configured to retrieve the set of security levels and the set of functional IDs from the buffer to perform the comparison operations.

When the security attribute SCT does not match any of the set of security levels or when the functional ID FNT does not match any of the set of functional IDs, the validation of the functional circuit 106 may be unsuccessful (e.g., the security system 110 may determine that the functional circuit 106 is not authorized to access the memory 104). In such a scenario, the security system 110 may be further configured to discard the request packet RP from the queue. Additionally, the security system 110 may be configured to provide a first feedback signal (not shown) to the functional circuit 106 to indicate that the indirect memory access is denied. Conversely, the security system 110 may validate the functional circuit 106 based on a match between the security attribute SCT and one of the set of security levels and a match between the functional ID FNT and one of the set of functional IDs. For the sake of ongoing discussion, it is assumed that the functional circuit 106 is successfully validated.

On successful validation of the functional circuit 106, the security system 110 may be further configured to identify an instruction sequence ISQ associated with the indirect memory access. The request packet RP (e.g., the sequence ID) may be utilized for identifying the instruction sequence ISQ. Thus, the security system 110 may identify the instruction sequence ISQ based on the request packet RP and the validation of the functional circuit 106. To identify the instruction sequence ISQ, the security system 110 may be further configured to access a look-up table LT.

Figure 2:
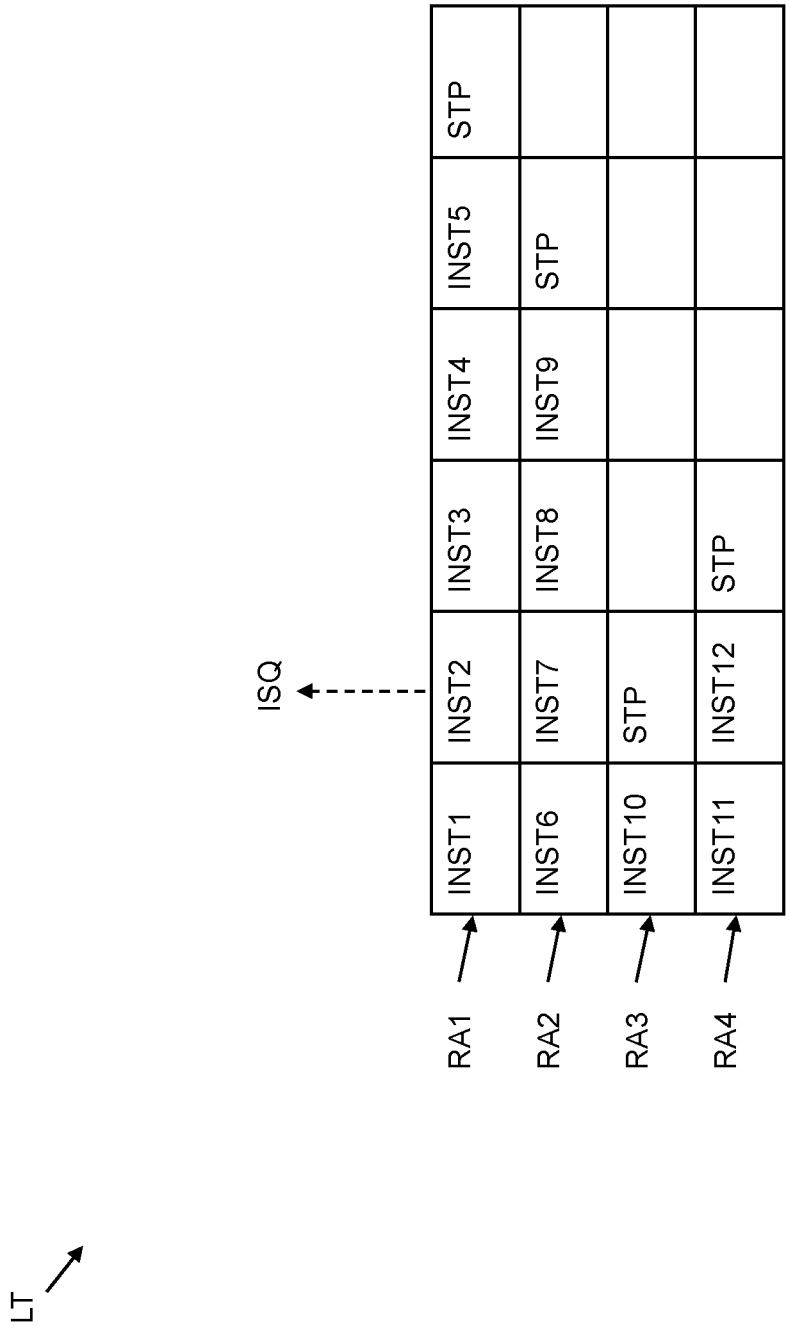
FIG. 2 illustrates a look-up table of the electronic circuitry of FIG. 1 in accordance with an embodiment of the present disclosure.

The first storage circuit 112 may be configured to store the look-up table LT. The first storage circuit 112 may include a first set of flip-flops (not shown) that store the look-up table LT. The look-up table LT may include a plurality of rows that are indicative of a plurality of instruction sequences. The plurality of rows may have a plurality of row addresses (shown later in FIG. 2) associated therewith. Further, the sequence ID of the request packet RP may be indicative of a row address associated with the look-up table LT. The security system 110 may be further configured to compare the sequence ID with the plurality of row addresses. In such a scenario, the instruction sequence ISQ may be identified based on a match between the sequence ID and one of the plurality of row addresses. Further, the security system 110 may be configured to retrieve the instruction sequence ISQ from the look-up table LT. The look-up table LT is illustrated in FIG. 2.

The security system 110 may be further configured to determine whether the indirect memory access corresponds to the atomic operation or the data transfer operation based on the request packet RP. For example, the security system 110 may determine that the indirect memory access corresponds to the atomic operation when the data size has a null value. Conversely, the security system 110 may determine that the indirect memory access corresponds to the data transfer operation when the data size has a non-zero value.

In the look-up table LT, the plurality of instruction sequences may be divided into two parts, namely, a first set of instruction sequences corresponding to the data transfer operation and a second set of instruction sequences corresponding to the atomic operation. In other words, the plurality of row addresses may be divided into two parts, namely, a first set of row addresses that is associated with the data transfer operation and a second set of row addresses that is associated with the atomic operation.

When the indirect memory access corresponds to the data transfer operation, the security system 110 may be further configured to determine whether the identified instruction sequence ISQ matches one of the first set of instruction sequences. When the identified instruction sequence ISQ does not match any of the first set of instruction sequences, the security system 110 may discard the request packet RP from the queue and provide the first feedback signal to the functional circuit 106. Conversely, when the identified instruction sequence ISQ matches one of the first set of instruction sequences, the identified instruction sequence ISQ is successfully validated. Similarly, when the indirect memory access corresponds to the atomic operation, the security system 110 may be further configured to determine whether the identified instruction sequence ISQ matches one of the second set of instruction sequences. When the identified instruction sequence ISQ does not match any of the second set of instruction sequences, the security system 110 may discard the request packet RP from the queue and provide the first feedback signal to the functional circuit 106. Conversely, when the identified instruction sequence ISQ matches one of the second set of instruction sequences, the identified instruction sequence ISQ is successfully validated. For the ongoing discussion, it is assumed that the identified instruction sequence ISQ is validated.

The security system 110 may be further configured to determine, based on the instruction sequence ISQ, the type of the indirect memory access. The type of the indirect memory access for the data transfer operation may correspond to the write access type or the read access type. On the other hand, the second set of instruction sequences associated with the atomic operation includes non-read instructions. Hence, the type of the indirect memory access for the atomic operation corresponds to the write access type.

The security system 110 may be further configured to validate the type of the indirect memory access based on the security attribute SCT, the privilege attribute PRV, the request packet RP, and the validation of the instruction sequence ISQ. The validation of the type of the indirect memory access may correspond to validation of the request packet RP (e.g., an access request for accessing the memory 104). The validation of the type of the indirect memory access for the data transfer operation is different from that for the atomic operation.

Data Transfer Operation:

When the indirect memory access corresponds to the data transfer operation, the security system 110 may perform various operations to validate the type of the indirect memory access. For example, the security system 110 may be further configured to determine a plurality of access addresses associated with the indirect memory access. The plurality of access addresses may be determined based on the start address and the data size. A number of access addresses of the plurality of access addresses may be equal to the data size. Further, the plurality of access addresses may be sequential, with a first access address corresponding to the start address. In the present disclosure, various memory addresses of the memory 104 may be divided into a plurality of address ranges (shown later in FIG. 3) such that each address range includes one or more memory addresses associated with the memory 104. The plurality of address ranges is mutually exclusive (e.g., one or more memory addresses included in one address range are mutually exclusive to one or more memory addresses included in each remaining address range). Thus, any two address ranges do not include the same memory address. The plurality of address ranges may be mapped to a plurality of policy values (shown later in FIG. 3). Each policy value may be associated with various authorized indirect memory access types.

The security system 110 may be further configured to determine whether one of the plurality of address ranges includes the plurality of access addresses. In other words, the security system 110 may be further configured to determine whether the plurality of access addresses is included in a single address range or overlaps between two or more address ranges. When the plurality of access addresses overlaps between address ranges, the security system 110 may discard the request packet RP from the queue and provide the first feedback signal to the functional circuit 106. For the sake of ongoing discussion, it is assumed that a first address range (shown later in FIG. 3) of the plurality of address ranges includes the plurality of access addresses. In such a scenario, the security system 110 may be further configured to identify, from the plurality of policy values, based on the determination that the first address range includes the plurality of access addresses, a first policy value PV1 associated with the first address range.

Figure 3:
FIG. 3 illustrates an address range table of the electronic circuitry of FIG. 1 in accordance with an embodiment of the present disclosure.

To determine that the first address range includes the plurality of access addresses and to identify the first policy value PV1 associated with the first address range, the security system 110 may be further configured to access an address range table AT. The first storage circuit 112 may be configured to store the address range table AT. The first storage circuit 112 may include a second set of flip-flops (not shown) that store the address range table AT. The address range table AT indicates the mapping between the plurality of address ranges and the plurality of policy values. The first policy value PV1 may thus be retrieved from the address range table AT. The address range table AT is illustrated in FIG. 3.

The security system 110 may be further configured to determine a set of indirect memory access types MAS authorized for the functional circuit 106 based on the first policy value PV1, the security attribute SCT, and the privilege attribute PRV. To determine the set of indirect memory access types MAS, the security system 110 may be further configured to access a memory access table MT. The first storage circuit 112 may be configured to store the memory access table MT. The first storage circuit 112 may include a third set of flip-flops (not shown) that store the memory access table MT.

The memory access table MT may indicate a mapping between the plurality of policy values, a plurality of security levels (shown later in FIG. 4), a plurality of privilege levels (shown later in FIG. 4), and a plurality of indirect memory access types. Each policy value of the plurality of policy values is indicative of one or more authorized indirect memory access types associated with a combination of one of the plurality of security levels and one of the plurality of privilege levels. In an example, one of the plurality of security levels corresponds to the non-secure level and one of the plurality of privilege levels corresponds to the high-privilege level. Thus, each policy value of the plurality of policy values is indicative of one or more authorized indirect memory access types (e.g., the write access type, the read access type, or both) for functional circuits having non-secure and high-privilege levels as security and privilege attributes, respectively. Each policy value of the plurality of policy values may be similarly indicative of various authorized indirect memory access types for functional circuits having various other combinations of security and privilege attributes.

Figure 4:
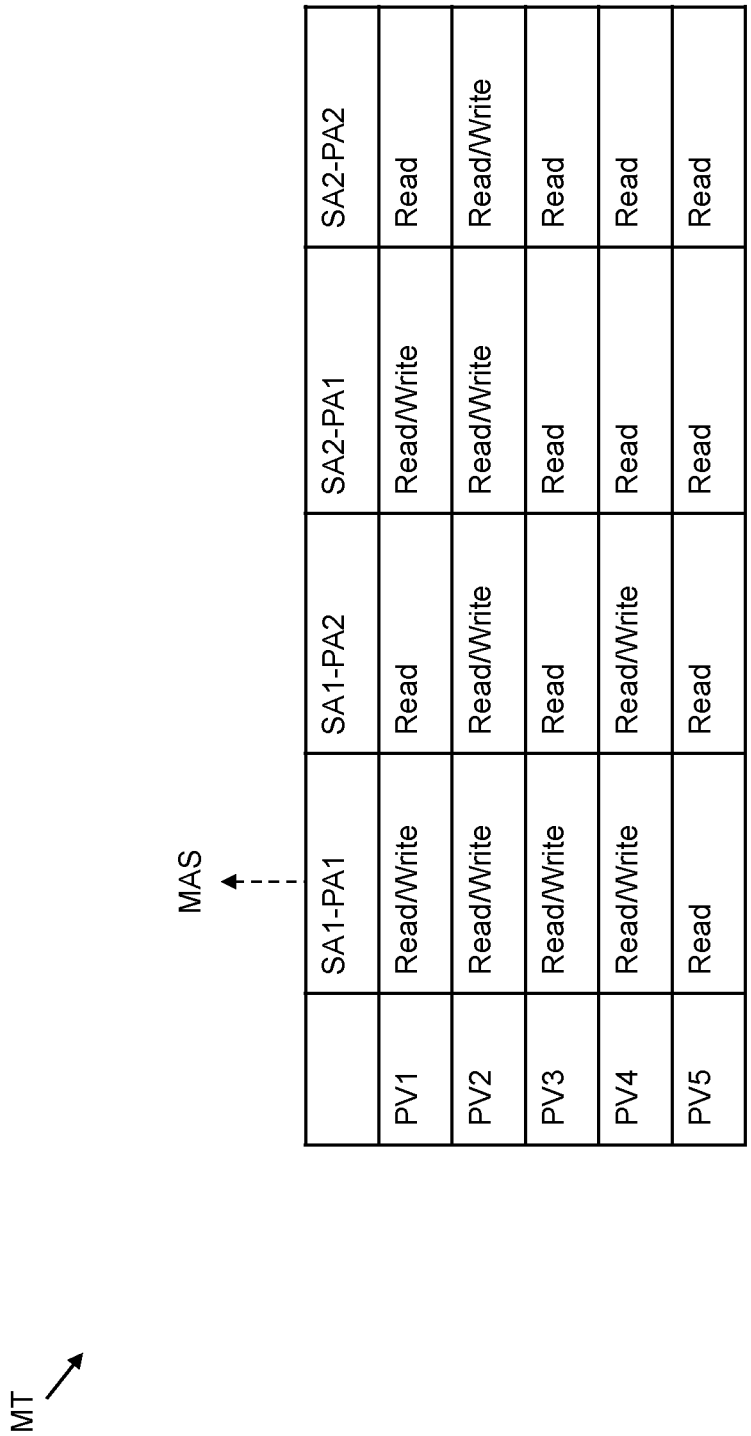
FIG. 4 illustrates a memory access table of the electronic circuitry of FIG. 1 in accordance with an embodiment of the present disclosure.

The security system 110 may be further configured to compare the first policy value PV1 with each of the plurality of policy values. Further, the security system 110 may be configured to compare the security attribute SCT of the functional circuit 106 with each of the plurality of security levels and compare the privilege attribute PRV of the functional circuit 106 with each of the plurality of privilege levels. The set of indirect memory access types MAS is determined based on a match between the first policy value PV1 and one of the plurality of policy values, a match between the security attribute SCT and one of the plurality of security levels, and a match between the privilege attribute PRV and one of the plurality of privilege levels. The memory access table MT is illustrated in FIG. 4. The address range table AT and the memory access table MT, in conjunction, enable partitioning of the memory addresses of the memory 104 and controlling accesses to each partition.

The security system 110 may be further configured to compare the type of the indirect memory access with the set of indirect memory access types MAS to validate the type of the indirect memory access. For example, when the type of the indirect memory access does not match any of the set of indirect memory access types MAS, the security system 110 may discard the request packet RP and provide the first feedback signal to the functional circuit 106. Conversely, the type of the indirect memory access is successfully validated when the type of the indirect memory access matches one of the set of indirect memory access types MAS. For the sake of ongoing discussion, it is assumed that the type of the indirect memory access matches one of the set of indirect memory access types MAS.

Atomic Operation:

When the indirect memory access corresponds to the atomic operation, the security system 110 may perform various operations to validate the type of the indirect memory access. For example, the security system 110 may be further configured to identify the first policy value PV1 associated with the atomic operation. The first policy value PV1 may correspond to a policy value that is dedicated to the atomic operation. The same policy value (e.g., the first policy value PV1) is described to be identified for both the data transfer and atomic operations to keep the description concise and clear and should not be considered as a limitation of the present disclosure. In various other embodiments, any of the remaining policy values of the plurality of policy values may be identified for the atomic operation, without deviating from the scope of the present disclosure.

The security system 110 may be further configured to determine the set of indirect memory access types MAS authorized for the functional circuit 106 based on the first policy value PV1, the security attribute SCT, and the privilege attribute PRV. The security system 110 may access the memory access table MT to determine the set of indirect memory access types MAS, in a similar manner as described above. Further, the security system 110 may be configured to compare the type of the indirect memory access with the set of indirect memory access types MAS to validate the type of the indirect memory access. For the sake of ongoing discussion, it is assumed that the type of the indirect memory access matches one of the set of indirect memory access types MAS.

The difference between the data transfer and atomic operations is the absence of the packet data PD for the atomic operation. Additionally, the value of the data size in the request packet RP is different for both operations. Thus, for the data transfer operation, the associated policy value is identified based on the plurality of access addresses, whereas for the atomic operation, a dedicated policy may be defined. Other functionalities of the security system 110 remain the same for both the data transfer and atomic operations.

Based on the successful validation of the type of the indirect memory access, the security system 110 may be further configured to store the request packet RP in the second storage circuit 114. The second storage circuit 114 may include a fourth set of flip-flops (not shown) where the request packet RP is stored. The security system 110 may be further configured to provide a second feedback signal (not shown) to the functional circuit 106 indicating that the indirect memory access is granted.

When the indirect memory access corresponds to the write operation, the security system 110 may be further configured to receive, based on the validation of the type of the indirect memory access, the functional ID FNT and the packet data PD associated with the write operation. Further, when the functional circuit 106 is initially validated, the security system 110 may be configured to store the associated functional ID FNT in the buffer.

When the functional ID FNT and the packet data PD are received for the write operation, the security system 110 may be further configured to validate, based on the received functional ID FNT, the functional circuit 106 for the write operation. In such a scenario, the security system 110 may validate the functional circuit 106 by comparing two functional IDs, e.g., the one received from the functional circuit 106 during the write operation and the one stored in the buffer. Based on the validation of the functional circuit 106 for the write operation, the security system 110 may be further configured to unlatch a lock associated with a portion of the second storage circuit 114 where data associated with the indirect memory access is to be stored. In such cases, the second feedback signal may further indicate that the lock associated with the second storage circuit 114 is unlatched. In response, the functional circuit 106 may be further configured to write the packet data PD associated with the indirect memory access to the unlatched portion of the second storage circuit 114. The packet data PD is written to a predetermined number of memory locations. The functional circuit 106 thus writes the packet data PD to the second storage circuit 114 based on the validation of the type of the indirect memory access. In other words, the packet data PD is secured. Thus, exclusively the validated functional circuit 106 may write to the second storage circuit 114.

The atomic or data transfer operation may be executed on the memory 104 based on the request packet RP stored in the second storage circuit 114. In other words, based on the validation of the functional circuit 106 and the validation of the type of the indirect memory access, the instruction sequence ISQ is executed, thereby facilitating the indirect memory access for the functional circuit 106.

The memory controller 116 may be coupled to the memory 104 and the second storage circuit 114. The memory controller 116 may include suitable circuitry that may be configured to perform one or more operations. For example, the memory controller 116 may be configured to receive a trigger signal (not shown) when the request packet RP is stored in the second storage circuit 114. The trigger signal may be generated by the security system 110 or a core circuit (not shown) of the IC 102. Based on the trigger signal, the memory controller 116 may be further configured to retrieve the request packet RP from the second storage circuit 114. The memory controller 116 may be further configured to identify the instruction sequence ISQ associated with the indirect memory access based on the request packet RP (e.g., the sequence ID).

To identify the instruction sequence ISQ, the memory controller 116 may be further configured to access the look-up table LT. The second storage circuit 114 may be configured to store the look-up table LT. The second storage circuit 114 may include a fifth set of flip-flops (not shown) that store the look-up table LT. Thus, the same look-up table LT may be stored in both the first and second storage circuits 112 and 114. The memory controller 116 may identify the instruction sequence ISQ in the look-up table LT in the same manner as that described above for the security system 110. For example, the memory controller 116 may be further configured to compare the sequence ID with the plurality of row addresses of the plurality of rows. In such a scenario, the instruction sequence ISQ may be identified based on the match between the sequence ID and one of the plurality of row addresses. Further, the memory controller 116 may be configured to retrieve the instruction sequence ISQ from the look-up table LT and execute the instruction sequence ISQ on the memory 104. The execution of the instruction sequence ISQ for the data transfer operation may be different from that for the atomic operation.

Data Transfer Operation:

When the indirect memory access corresponds to the data transfer operation, the memory controller 116 may be configured to perform various operations to execute the instruction sequence ISQ. For example, the memory controller 116 may be further configured to determine the plurality of access addresses associated with the indirect memory access. The plurality of access addresses may be determined based on the start address and the data size.

When the data transfer operation corresponds to the read operation, the instruction sequence ISQ may be executed on the plurality of access addresses of the memory 104 to read the reference data. The memory controller 116 may be further configured to provide the reference data to the functional circuit 106. On the other hand, when the data transfer operation corresponds to the write operation, the memory controller 116 may be further configured to retrieve the packet data PD from the second storage circuit 114, and write the packet data PD to the memory 104 (e.g., the plurality of access addresses of the memory 104). In other words, the instruction sequence ISQ may be executed on the plurality of access addresses of the memory 104 to write the packet data PD. Further, the memory controller 116 may be configured to provide the first acknowledgment indicative of the successful execution of the write operation to the functional circuit 106. On the execution of both the aforementioned operations, the memory controller 116 may provide a third feedback signal (not shown) to the security system 110 to clear the queue.

Atomic Operation:

When the indirect memory access corresponds to the atomic operation, a portion (e.g., a chip, a block, or the like) of the memory 104 or the memory 104 in entirety may be accessed. Hence, the memory controller 116 may not be required to determine any access addresses. In such cases, the execution of the instruction sequence ISQ may correspond to erasure of the chip, the block, or the like, of the memory 104 or erasure of the memory 104 in entirety. On the execution of the atomic operation, the memory controller 116 may provide the second acknowledgment to the functional circuit 106 and the third feedback signal to the security system 110.

Thus, the request packet RP is stored in the second storage circuit 114, and the memory controller 116 utilizes the request packet RP to access the memory 104. Such a memory access is referred to as the indirect memory access. The security system 110 may thus secure the indirect memory access of the memory 104.

The scope of the present disclosure is not limited to securing a single indirect memory access. In various other embodiments, multiple indirect memory accesses generated by the functional circuit 106 may be secured in a similar manner as described above, without deviating from the scope of the present disclosure.

Although the IC 102 is shown to include a single functional circuit (e.g., the functional circuit 106), the scope of the present disclosure is not limited to it. In various other embodiments, the IC 102 may include multiple functional circuits, without deviating from the scope of the present disclosure. In such a scenario, one or more indirect memory accesses initiated (e.g., one or more request packets generated) by each functional circuit may be secured in a similar manner as described above.

The scope of the present disclosure is not limited to validating the functional circuit 106 based on the security attribute SCT and the functional ID FNT. In various other embodiments, the functional circuit 106 may be validated based on at least one of the security attribute SCT, the privilege attribute PRV, and the functional ID FNT, without deviating from the scope of the present disclosure.

Although it is described that a single dedicated policy value is defined for the atomic operation, the scope of the present disclosure is not limited to it. In various other embodiments, two or more policy values may be defined for the atomic operations, without deviating from the scope of the present disclosure. In such a scenario, the security system 110 may be configured to select one policy value based on a type of the atomic operation.

In addition to the indirect memory access, the functional circuit 106 may be further configured to access status registers (not shown) associated with the memory 104. In such a scenario, the security system 110 may validate the functional circuit 106 in a similar manner as described above for facilitating the access to the status registers.

FIG. 2 illustrates the look-up table LT in accordance with an embodiment of the present disclosure. The look-up table LT may include the plurality of rows indicative of the plurality of instruction sequences. The plurality of rows has the plurality of row addresses associated therewith. The core circuit may be configured to store the look-up table LT in the first storage circuit 112 during a boot operation of the electronic circuitry 100.

As illustrated in FIG. 2, the plurality of rows may include first through fourth rows. The first through fourth rows have first through fourth row addresses RA1-RA4 associated therewith, respectively. The plurality of row addresses may thus be hereinafter referred to and designated as "the plurality of row addresses RA1-RA4".

The first row of the look-up table LT may include first through fifth instructions INST1-INST5, the second row of the look-up table LT may include sixth through ninth instructions INST6-INST9, the third row of the look-up table LT may include a tenth instruction INST10, and the fourth row of the look-up table LT may include eleventh and twelfth instructions INST11 and INST12. For the sake of ongoing discussion, it is assumed that the instruction sequences of the first through third rows may be associated with the data transfer operation and that of the fourth row may be associated with the atomic operation. In an example, the first through fifth instructions INST1-INST5 correspond to instructions indicative of a read command, a row address, a column address, one or more dummy cycles, and data read, respectively. The sixth through tenth instructions INST6-INST10 may also include instructions corresponding to the data transfer operation. Further, the eleventh and twelfth instructions INST11 and INST12 correspond to instructions indicative of an erase command and a sector address, respectively. Each instruction sequence may end with a stop instruction STP indicative of a halt in the execution of the corresponding instruction sequence.

The plurality of instruction sequences may be divided into the first and second sets of instruction sequences corresponding to the data transfer and atomic operations, respectively. In other words, the first through fourth row addresses RA1-RA4 may be divided into two sets of row addresses associated with the data transfer and atomic operations, respectively. Thus, the first through third row addresses RA1-RA3 may be associated with the data transfer operation and the fourth row address RA4 may be associated with the atomic operation.

The security system 110 may access the look-up table LT to identify the instruction sequence ISQ. In such a scenario, the security system 110 may compare the sequence ID with the plurality of row addresses RA1-RA4 of the plurality of rows. For the sake of ongoing discussion, it is assumed that the sequence ID matches the first row address RA1. Thus, the first through fifth instructions INST1-INST5 and the stop instruction STP may correspond to the instruction sequence ISQ. The instruction sequence ISQ may thus be identified based on the match between the sequence ID and the first row address RA1. Further, the security system 110 may determine whether the instruction sequence ISQ is included in the first set of instruction sequences or the second set of instruction sequences to validate the instruction sequence ISQ.

The scope of the present disclosure is not limited to the look-up table LT including four rows. In various other embodiments, the look-up table LT may include more than or less than four rows, without deviating from the scope of the present disclosure. The same look-up table LT may be stored in the second storage circuit 114.

FIG. 3 illustrates the address range table AT in accordance with an embodiment of the present disclosure. The address range table AT may indicate the mapping between the plurality of address ranges and the plurality of policy values. The core circuit may be configured to store the address range table AT in the first storage circuit 112 during the boot operation of the electronic circuitry 100.

As illustrated in FIG. 3, the plurality of address ranges includes the first address range (hereinafter referred to and designated as the "first address range AR1" and second through fifth address ranges AR2-AR5, whereas the plurality of policy values may include the first policy value PV1 and second through fifth policy values PV2-PV5. Thus, the plurality of address ranges may be hereinafter referred to and designated as the "plurality of address ranges AR1-AR5", and the plurality of policy values may be hereinafter referred to and designated as the "plurality of policy values PV1-PV5".

As illustrated by a first row of the address range table AT, the first address range AR1 is mapped to the first policy value PV1. Similarly, as illustrated by second through fifth rows of the address range table AT, the second through fourth address ranges AR2-AR5 are mapped to second through fifth policy values PV2-PV5, respectively. In an embodiment, each policy value of the first through fifth policy values PV1-PV5 corresponds to a 3-bit binary number (e.g., '101', '111', '110', or the like). Further, the plurality of address ranges AR1-AR5 is mutually exclusive. For example, the memory addresses included in the first address range AR1 may be different from that included in any of the second through fifth address ranges AR2-AR5.

The security system 110 may access the address range table AT to determine whether one of the plurality of address ranges AR1-AR5 includes the plurality of access addresses. As it is determined that the first address range AR1 includes the plurality of access addresses, the security system 110 may identify, from the plurality of policy values PV1-PV5, the first policy value PV1 associated with the first address range AR1.

The scope of the present disclosure is not limited to the address range table AT including five address ranges and five policy values associated therewith. In various other embodiments, a count of the address ranges and a count of associated policy values may be greater than or less than five, without deviating from the scope of the present disclosure.

FIG. 4 illustrates the memory access table MT in accordance with an embodiment of the present disclosure. The memory access table MT may indicate the mapping between the plurality of policy values PV1-PV5, the plurality of security levels, the plurality of privilege levels, and the plurality of indirect memory access types. As illustrated in FIG. 4, the plurality of security levels includes a first security level SA1 (e.g., the secure level) and a second security level SA2 (e.g., the non-secure level). Thus, the plurality of security levels may be hereinafter referred to and designated as the "plurality of security levels SA1 and SA2". Similarly, the plurality of privilege levels may include a first privilege level PA1 (e.g., the high-privilege level) and a second privilege level PA2 (e.g., the low-privilege level). Thus, the plurality of privilege levels may be hereinafter referred to and designated as the "plurality of privilege levels PA1 and PA2". The core circuit may be configured to store the memory access table MT in the first storage circuit 112 during the boot operation of the electronic circuitry 100.

As illustrated in FIG. 4, each policy value of the plurality of policy values PV1-PV5 is indicative of the one or more authorized indirect memory access types associated with the combination of one of the plurality of security levels SA1 and SA2 and one of the plurality of privilege levels PA1 and PA2. For example, the one or more authorized indirect memory access types for the first policy value PV1 and a combination of the first security level SA1 and the first privilege level PA1 may include the read access type and the write access type. For the first policy value PV1, other combinations of security and privilege levels may result in different authorized indirect memory access types. For example, for a combination of the first security level SA1 and the second privilege level PA2 and a combination of the second security level SA2 and the second privilege level PA2, the read access type may be authorized, whereas for a combination of the second security level SA2 and the first privilege level PA1, both the read and write access types may be authorized.

The one or more authorized indirect memory access types for the second policy value PV2 and each of the four combinations of the security and privilege levels may include the read and write access types. The one or more authorized indirect memory access types for the third policy value PV3 and the combination of the first security level SA1 and the first privilege level PA1 may include the read and write access types. On the other hand, for the third policy value PV3 and each of the other three combinations of security and privilege levels, the read access type may be authorized. Further, for the fourth policy value PV4 and the combination of the first security level SA1 and each of the first and second privilege levels PA1 and PA2, both the read and write access types may be authorized. On the other hand, for the fourth policy value PV4 and the combination of the second security level SA2 and each of the first and second privilege levels PA1 and PA2, the one or more authorized indirect memory access types may include the read access type. The one or more authorized indirect memory access types for the fifth policy value PV5 and each of the four combinations of the security and privilege levels may include the read access type. Access to various memory address partitions of the memory 104 is thus controlled by way of the memory access table MT.

The security system 110 may compare the first policy value PV1 with each of the plurality of policy values PV1-PV5. Further, the security system 110 may compare the security attribute SCT of the functional circuit 106 with each of the plurality of security levels SA1 and SA2 and compare the privilege attribute PRV of the functional circuit 106 with each of the plurality of privilege levels PA1 and PA2. The set of indirect memory access types MAS is determined based on the match between the first policy value PV1 and one of the plurality of policy values PV1-PV5, the match between the security attribute SCT of the functional circuit 106 and one of the plurality of security levels SA1 and SA2, and the match between the privilege attribute PRV of the functional circuit 106 and one of the plurality of privilege levels PA1 and PA2. For the sake of ongoing discussion, it is assumed that the security attribute SCT corresponds to the first security level SA1 and the privilege attribute PRV corresponds to the first privilege level PA1. Thus, the set of indirect memory access types MAS for the first policy value PV1 may include the read and write access types.

The scope of the present disclosure is not limited to the memory access table MT including five policy values, two security levels, and two privilege levels. In various other embodiments, the memory access table MT may include more than or less than five policy values, more than or less than two security levels, and more than or less than two privilege levels, without deviating from the scope of the present disclosure.

Data stored in the memory 104 is encrypted. Hence, as illustrated in the memory access table MT of FIG. 4, the read access type is authorized for each combination. However, the scope of the present disclosure is not limited to it. In various other embodiments, the read access type may be authorized for limited combinations of security and privilege levels, without deviating from the scope of the present disclosure.

FIGS. 5A-5E, collectively, represents a flowchart 500 that illustrates a method for securing an indirect memory access of the memory 104 in accordance with an embodiment of the present disclosure.

Figure 5A:
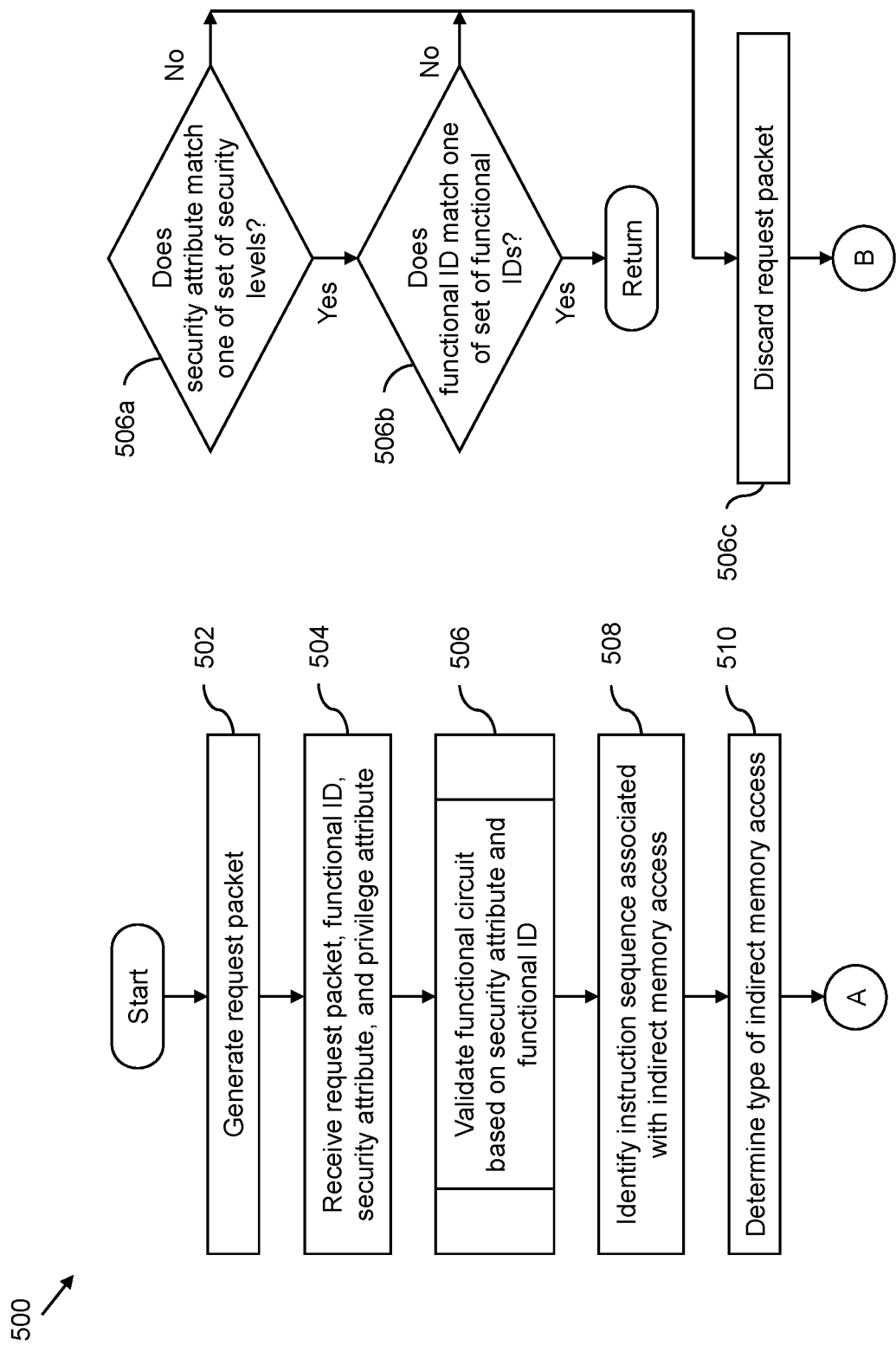
FIGS. 5A-5E, collectively, represents a flowchart that illustrates a method for securing an indirect memory access of a memory of the electronic circuitry of FIG. 1 in accordance with an embodiment of the present disclosure.

The functional circuit 106 may initiate the indirect memory access of the memory 104. Referring to FIG. 5A, at step 502, the functional circuit 106 may generate the request packet RP for the indirect memory access. At step 504, the security system 110 may receive the request packet RP from the functional circuit 106, and the functional ID FNT, the security attribute SCT, and the privilege attribute PRV from the control circuit 108. At step 506, the security system 110 may validate the functional circuit 106 based on the security attribute SCT and the functional ID FNT.

To validate the functional circuit 106, the security system 110 may perform various operations. For example, at step 506a, the security system 110 may compare the security attribute SCT with the set of security levels and determine whether the security attribute SCT matches one of the set of security levels. If at step 506a, the security system 110 determines that the security attribute SCT matches one of the set of security levels, step 506b is performed. At step 506b, the security system 110 may compare the functional ID FNT with the set of functional IDs and determine whether the functional ID FNT matches one of the set of functional IDs. If at step 506b, the security system 110 determines that the functional ID FNT matches one of the set of functional IDs, the functional circuit 106 is successfully validated and step 508 is performed. However, if at step 506a, the security system 110 determines that the security attribute SCT does not match any of the set of security levels or if at step 506b, the security system 110 determines that the functional ID FNT does not match any of the set of functional IDs, step 506c is performed. At step 506c, the security system 110 may discard the request packet RP.

At step 508, the security system 110 may identify, based on the sequence ID, the instruction sequence ISQ associated with the indirect memory access. The instruction sequence ISQ may be identified based on the match between the sequence ID and one of the plurality of row addresses RA1-RA4 of the look-up table LT. At step 510, the security system 110 may determine the type of the indirect memory access based on the instruction sequence ISQ.

Figure 5B:
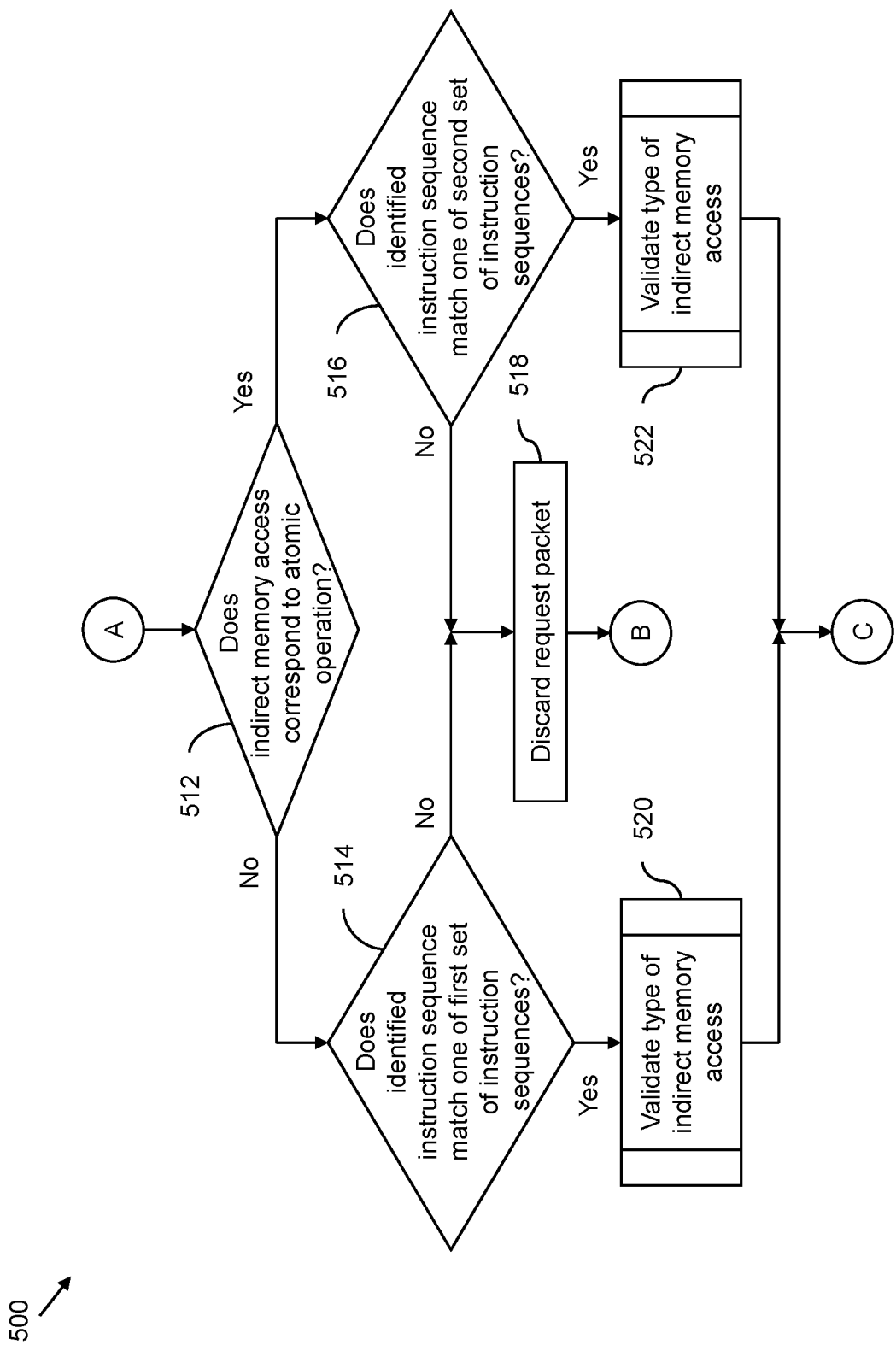

Referring to FIG. 5B, at step 512, the security system 110 may determine whether the indirect memory access corresponds to the atomic operation. If at step 512, the security system 110 determines that the indirect memory access does not correspond to the atomic operation, step 514 is performed. At step 514, the security system 110 may determine whether the identified instruction sequence ISQ matches one of the first set of instruction sequences of the look-up table LT. Alternatively, if at step 512, the security system 110 determines that the indirect memory access corresponds to the atomic operation, step 516 is performed. At step 516, the security system 110 may determine whether the identified instruction sequence ISQ matches one of the second set of instruction sequences of the look-up table LT. If at step 514, the security system 110 determines that the instruction sequence ISQ does not match any of the first set of instruction sequences or if at step 516, the security system 110 determines that the instruction sequence ISQ does not match any of the second set of instruction sequences, step 518 is performed. At step 518, the security system 110 may discard the request packet RP.

If at step 514, the security system 110 determines that the instruction sequence ISQ matches one of the first set of instruction sequences, step 520 is performed. Similarly if at step 516, the security system 110 determines that the instruction sequence ISQ matches one of the second set of instruction sequences, step 522 is performed.

At step 520, the security system 110 may validate the type of the indirect memory access. Referring to FIG. 5D, to validate the type of the indirect memory access, the security system 110 may perform various operations. For example, at step 520a, the security system 110 may determine the plurality of access addresses associated with the indirect memory access. The plurality of access addresses may be determined based on the start address and the data size included in the request packet RP. At step 520b, the security system 110 may determine whether the plurality of access addresses is included in a single address range of the plurality of address ranges. If at step 520b, the security system 110 determines that the plurality of access addresses is included in a single address range, step 520c is performed. At step 520c, the security system 110 may identify the first policy value PV1 associated with the first address range AR1 that includes the plurality of access addresses. At step 520d, the security system 110 may determine the set of indirect memory access types MAS authorized for the functional circuit 106 based on the first policy value PV1, the security attribute SCT, and the privilege attribute PRV.

At step 520e, the security system 110 may compare the type of the indirect memory access and the set of indirect memory access types MAS and determine whether the type of the indirect memory access matches one of the set of indirect memory access types MAS. If at step 520e, the security system 110 determines that the type of the indirect memory access matches one of the set of indirect memory access types MAS, step 524 is performed. However, If at step 520b, the security system 110 determines that the plurality of access addresses is included in multiple address ranges or if at step 520e, the security system 110 determines that the type of the indirect memory access does not match any of the set of indirect memory access types MAS, step 520f is performed. At step 520f, the security system 110 may discard the request packet RP.

Referring back to FIG. 5B, at step 522, the security system 110 may validate the type of the indirect memory access. Referring to FIG. 5E, to validate the type of the indirect memory access for the atomic operation, the security system 110 may perform various operations. For example, at step 522a, the security system 110 may determine the first policy value PV1 associated with the atomic operation. At step 522b, the security system 110 may further determine the set of indirect memory access types MAS authorized for the functional circuit 106. At step 522c, the security system 110 may determine whether the type of the indirect memory access matches one of the set of indirect memory access types MAS. If at step 522c, the security system 110 determines that the type of the indirect memory access does not match any of the set of indirect memory access types MAS, step 522d is performed. At step 522d, the security system 110 may discard the request packet RP. If at step 522c, the security system 110 determines that the type of the indirect memory access matches one of the set of indirect memory access types MAS, step 524 is performed.

Figure 5C:
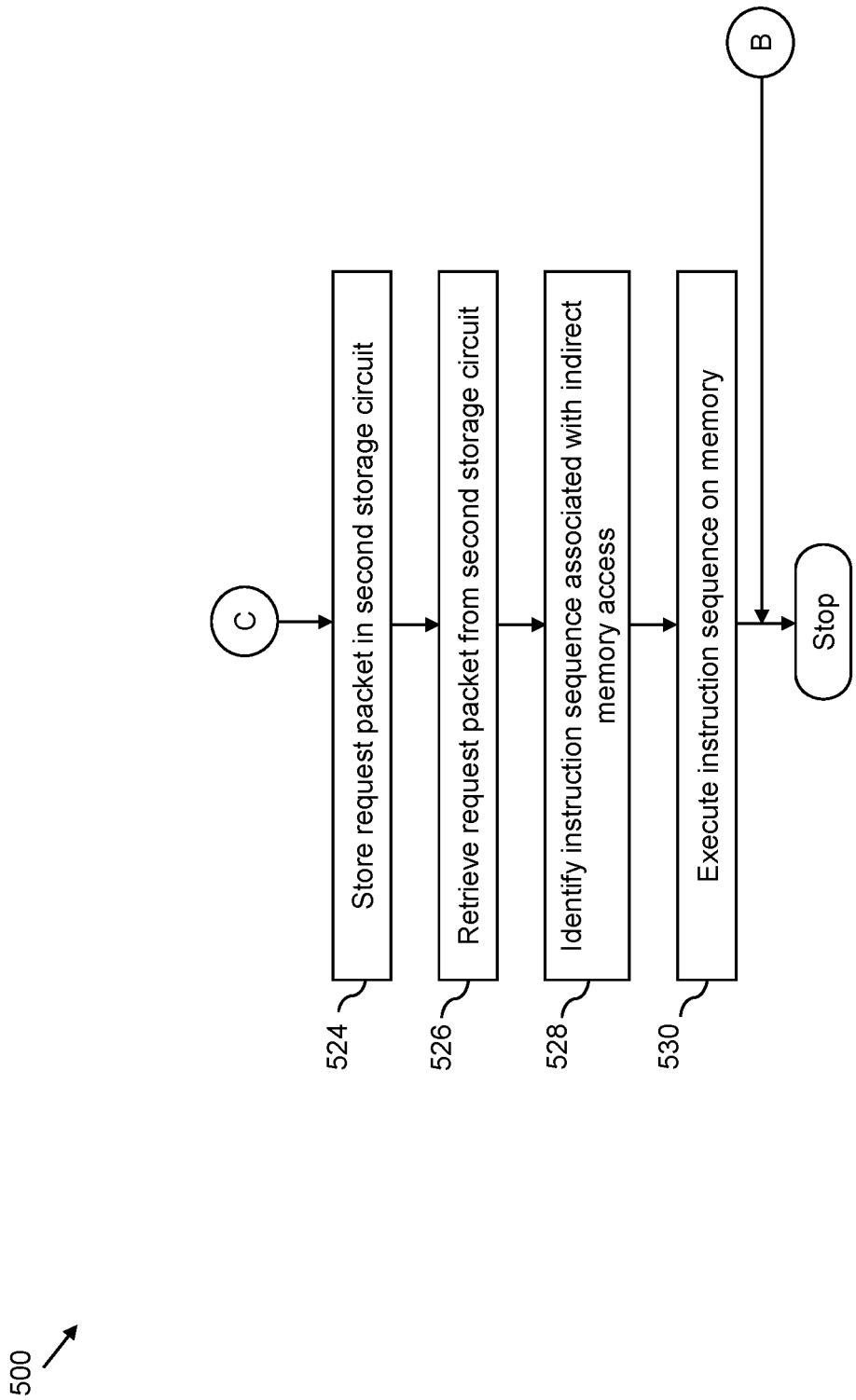
Figure 5D:
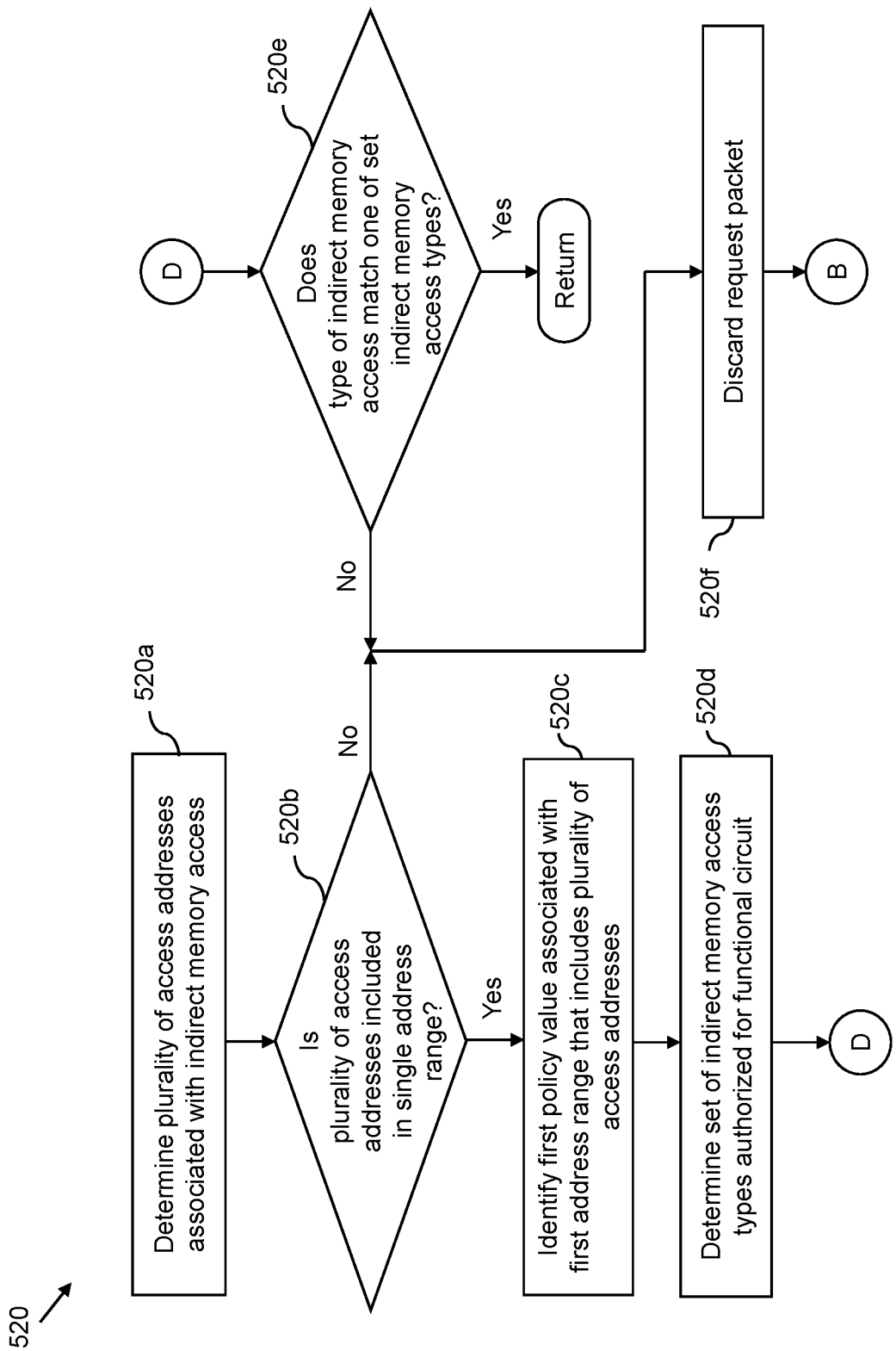
Figure 5E:
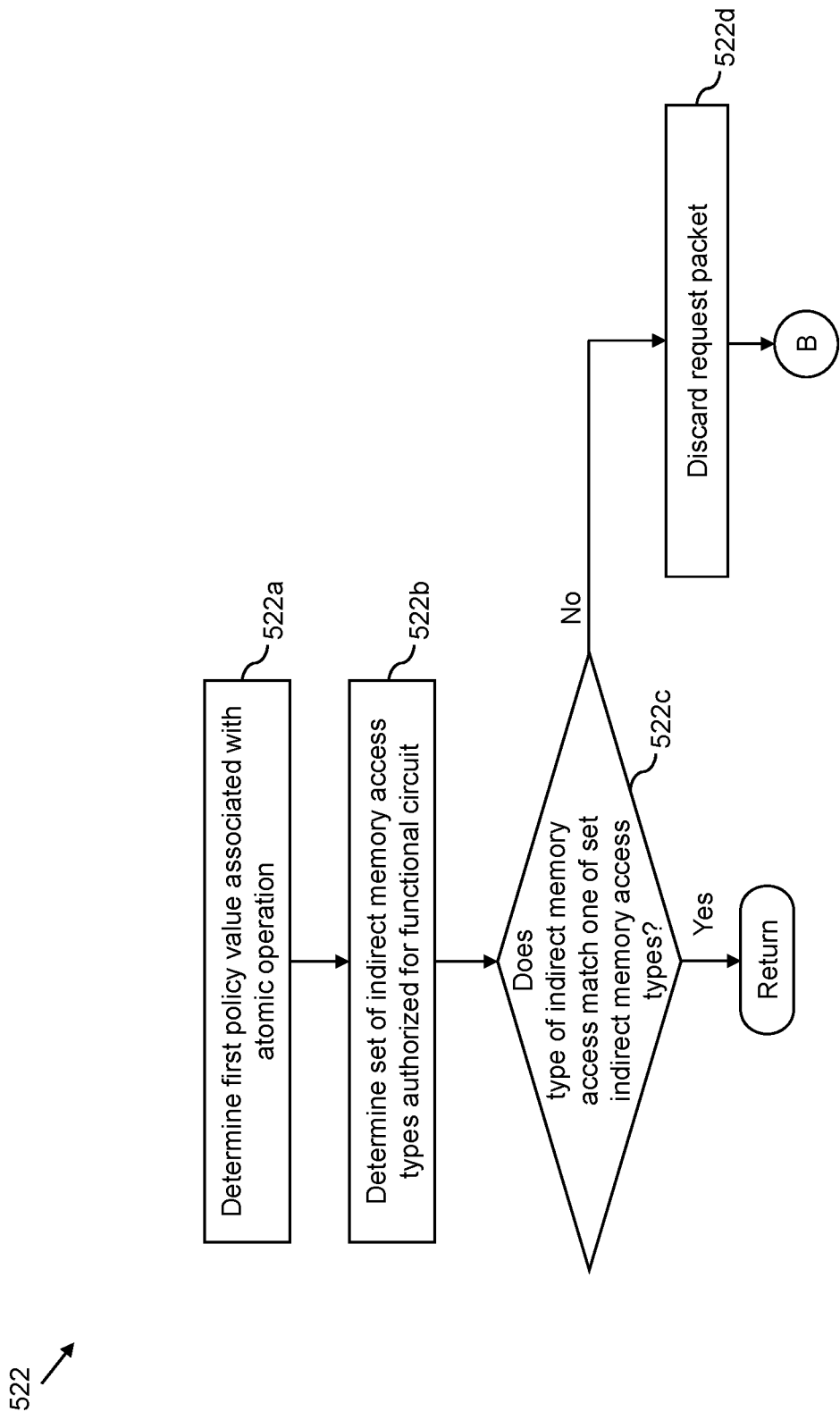

Referring to FIG. 5C, at step 524, the security system 110 may store the request packet RP in the second storage circuit 114. At step 526, the memory controller 116 may retrieve the request packet RP from the second storage circuit 114. At step 528, the memory controller 116 may identify the instruction sequence ISQ associated with the indirect memory access. At step 530, the memory controller 116 may execute the instruction sequence ISQ on the memory 104. Thus, the indirect memory access of the memory 104 for the functional circuit 106 is facilitated.

The flowchart 500 describes the execution of the instruction sequence ISQ corresponding to the read operation. For the write operation, additional steps may be performed. For example, the security system 110 may receive, based on the validation of the type of the indirect memory access, the functional ID FNT and the packet data PD associated with the write operation. The security system 110 may validate the functional circuit 106 for the write operation based on the received functional ID FNT. Further, based on the validation of the functional circuit 106 for the write operation, the functional circuit 106 may write the packet data PD associated with the indirect memory access to the second storage circuit 114. The memory controller 116 may retrieve the packet data PD from the second storage circuit 114 and write the packet data PD to the memory 104.

Thus, the security system 110 may secure the indirect memory access by validating the request packet RP and the functional circuit 106. Hence, exclusively the authorized indirect memory access types requested by the authorized functional circuits are executed by the memory controller 116. Additionally, the data to be written (e.g., the packet data PD) is secured. As a result, the indirect memory access authorized by the security system 110 is significantly more secure than that authorized by a conventional security system. Further, the memory 104 is less susceptible to corruption as compared to a memory whose accesses are secured by the conventional security system. Additionally, as one request packet (e.g., the request packet RP) is associated with an instruction sequence, multiple addresses are secured at once based on the validation of a single request packet. Consequently, the availability of the functional circuit 106 is significantly greater than that of a functional circuit providing access requests to the conventional security system.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. An integrated circuit (IC) configured to perform one or more operations that include accessing data stored within a memory that is external to the IC, the integrated circuit comprising:
   a first storage circuit configured to store a first look-up table that includes a plurality of rows indicative of a plurality of instruction sequences associated with accessing the data stored within the memory, and a plurality of addresses of the plurality of rows;
   a functional circuit configured to perform the one or more operations, wherein performing the one or more operations includes initiating an indirect memory access of the memory by generating a request packet for the indirect memory access, wherein the request packet includes a sequence identifier (ID) that indicates an address;
   a security system that is coupled to the functional circuit and to the first storage circuit, and the security system is configured to
      receive (i) the request packet from the functional circuit, (ii) a functional identifier (ID) that identifies the functional circuit, and (iii) a security attribute indicative of a security level of the functional circuit,
      validate the functional circuit based on the security attribute and the functional ID,
      when the functional circuit is successfully validated, identify an instruction sequence associated with the indirect memory access from the plurality of instruction sequences in the first look-up table by matching an address of the plurality of addresses in the first look-up table with the sequence ID in the request packet,
      determine, based on the sequence ID, a type of the indirect memory access, wherein the type of the indirect memory access includes an indirect memory access type selected from a write access type and a read access type, and
validate the type of the indirect memory access based on the security attribute and the request packet; and
a memory controller that is coupled to the memory, and, when the type of the indirect memory access is successfully validated, the memory controller is configured to
identify, based on the request packet, the instruction sequence associated with the indirect memory access, and
execute the instruction sequence on the memory, thereby facilitating the indirect memory access for the functional circuit.

2. The IC of claim 1, wherein to validate the functional circuit, the security system is further configured to (i) compare the security attribute with a set of security levels associated with authorized access of the memory and (ii) compare the functional ID with a set of functional IDs associated with the authorized access of the memory, and wherein the functional circuit is validated based on (i) a match between the security attribute and one of the set of security levels and (ii) a match between the functional ID and one of the set of functional IDs.

3. The IC of claim 1, wherein the security system is further configured to receive a privilege attribute indicative of a privilege level of the functional circuit, and wherein the security system validates the type of the indirect memory access further based on the privilege attribute.

4. The IC of claim 3, further comprising a control circuit that is coupled to the functional circuit and the security system, wherein the control circuit is configured to:
receive the request packet from the functional circuit;
determine, based on the request packet, the security attribute, the privilege attribute, and the functional ID of the functional circuit; and
provide the security attribute, the privilege attribute, and the functional ID to the security system.

5. The IC of claim 3, wherein the security system is further configured to determine, based on the request packet, whether the indirect memory access corresponds to at least one of a group consisting of an atomic operation and a data transfer operation, wherein the atomic operation is an operation that does not include a data transfer between the IC and the memory, and the data transfer operation is an operation that includes a data transfer between the IC and the memory.

6. The IC of claim 5, wherein various memory addresses of the memory are divided into a plurality of address ranges, each address range includes one or more memory addresses associated with the memory, and when the indirect memory access corresponds to the data transfer operation, to validate the type of the indirect memory access, the security system is further configured to:
determine a plurality of addresses associated with the indirect memory access, wherein the request packet comprises a start address and a data size associated with the indirect memory access, and wherein the plurality of addresses is determined based on the start address and the data size;
determine whether one of the plurality of address ranges comprises the plurality of addresses, wherein the plurality of address ranges is mapped to a plurality of policy values, and each policy value of the plurality of policy values indicates at least one indirect memory access type selected from the write access type and the read access type;
identify, from the plurality of policy values, based on the determination that a first address range of the plurality of address ranges comprises the plurality of addresses, a first policy value associated with the first address range;
determine a set of indirect memory access types authorized for the functional circuit based at least on the first policy value; and
compare the type of the indirect memory access with the set of indirect memory access types to validate the type of the indirect memory access.

7. The IC of claim 6, wherein the first storage circuit is further configured to store an address range table that indicates the mapping between the plurality of address ranges and the plurality of policy values, wherein the security system is further configured to access the address range table to determine that the first address range comprises the plurality of addresses and to identify the first policy value associated with the first address range, and wherein the plurality of address ranges is mutually exclusive.

8. The IC of claim 6, wherein the first storage circuit is further configured to store a memory access table that indicates a mapping between the plurality of policy values, a plurality of security levels, a plurality of privilege levels, and a plurality of indirect memory access types,
wherein each policy value of the plurality of policy values is indicative of one or more indirect memory access types associated with a combination of one of the plurality of security levels and one of the plurality of privilege levels,
wherein the security system is further configured to (i) compare the first policy value with each of the plurality of policy values, (ii) compare the security attribute of the functional circuit with each of the plurality of security levels, and (iii) compare the privilege attribute of the functional circuit with each of the plurality of privilege levels, and
wherein the set of indirect memory access types is determined based on (i) a match between the first policy value and one of the plurality of policy values, (ii) a match between the security attribute of the functional circuit and one of the plurality of security levels, and (iii) a match between the privilege attribute of the functional circuit and one of the plurality of privilege levels.

9. The IC of claim 5, wherein when the indirect memory access corresponds to the atomic operation, to validate the type of the indirect memory access, the security system is further configured to:
identify a first policy value associated with the atomic operation;
determine a set of indirect memory access types authorized for the functional circuit based at least on the first policy value; and
compare the type of the indirect memory access with the set of indirect memory access types to validate the type of the indirect memory access.

10. The IC of claim 9, wherein the first storage circuit is further configured to store a memory access table that indicates a mapping between a plurality of policy values, a plurality of security levels, a plurality of privilege levels, and a plurality of indirect memory access types,
wherein each policy value of the plurality of policy values is indicative of one or more indirect memory access types associated with a combination of one of the plurality of security levels and one of the plurality of privilege levels, wherein the security system is further configured to (i) compare the first policy value with each of the plurality of policy values, (ii) compare the security attribute of the functional circuit with each of the plurality of security levels, and (iii) compare the privilege attribute of the functional circuit with each of the plurality of privilege levels, and wherein the set of indirect memory access types for the functional circuit is determined based on (i) a match between the first policy value and one of the plurality of policy values, (ii) a match between the security attribute of the functional circuit and one of the plurality of security levels, and (iii) a match between the privilege attribute of the functional circuit and one of the plurality of privilege levels.

11. The IC of claim 5, wherein the plurality of instruction sequences comprises (i) a first set of instruction sequences corresponding to the data transfer operation and (ii) a second set of instruction sequences corresponding to the atomic operation, wherein when the indirect memory access corresponds to the data transfer operation, the security system is further configured to determine whether the identified instruction sequence matches one of the first set of instruction sequences such that the type of the indirect memory access is validated based on a match between the identified instruction sequence and one of the first set of instruction sequences, and wherein when the indirect memory access corresponds to the atomic operation, the security system is further configured to determine whether the identified instruction sequence matches one of the second set of instruction sequences such that the type of the indirect memory access is validated based on a match between the identified instruction sequence and one of the second set of instruction sequences.

12. The IC of claim 1, further comprising:

a second storage circuit coupled to the security system, wherein based on the validation of the type of the indirect memory access, the security system is further configured to store the request packet in the second storage circuit; and wherein the memory controller is coupled to the second storage circuit, and the memory controller is further configured to:
    retrieve the request packet from the second storage circuit before identifying the instruction sequence.

13. The IC of claim 12, wherein the second storage circuit is further configured to store a second look-up table that is a same look-up table as the first look-up table, wherein the second look-up table comprises a second plurality of rows indicative of the plurality of instruction sequences, wherein the memory controller is further configured to compare the sequence ID with a second plurality of addresses of the second plurality of rows, and wherein the instruction sequence is identified based on a match between the sequence ID and one of the second plurality of addresses.

14. The IC of claim 12, wherein the request packet comprises a start address and a data size associated with the indirect memory access, wherein the memory controller is further configured to determine a plurality of addresses associated with the indirect memory access based on the start address and the data size, and wherein the instruction sequence is executed on the plurality of addresses of the memory.

15. The IC of claim 12, wherein the indirect memory access corresponds to a write operation of the write access type, wherein the security system is further configured to (i) receive, based on the validation of the type of the indirect memory access, the functional ID and packet data associated with the write operation, and (ii) validate, based on the functional ID, the functional circuit for the write operation, wherein based on the validation of the functional circuit for the write operation, the functional circuit is further configured to write the packet data to the second storage circuit, and wherein the memory controller is further configured to retrieve the packet data from the second storage circuit and write the packet data to the memory.

16. A method, performed by an integrated circuit (IC), for securing an indirect memory access of data stored within a memory that is external to the IC, the method comprising:

performing one or more operations, by a functional circuit of the IC, wherein performing the one or more operations includes initiating the indirect memory access of the memory by generating a request packet for the indirect memory access, wherein the request packet includes a sequence identifier (ID) that indicates an address;

receiving, by a security system of the IC, (i) the request packet from the functional circuit, (ii) a functional identifier (ID) that identifies the functional circuit, and (iii) a security attribute indicative of a security level of the functional circuit;

validating, by the security system, the functional circuit based on the security attribute and the functional ID;

when the functional circuit is successfully validated,
    accessing, by the security system, a look-up table in a first storage circuit of the IC, wherein the look-up table includes a plurality of rows indicative of a plurality of instruction sequences associated with accessing the data stored within the memory, and a plurality of addresses of the plurality of rows, and
    identifying, by the security system, an instruction sequence associated with the indirect memory access from the plurality of instruction sequences in the look-up table by matching an address of the plurality of addresses in the look-up table with the sequence ID in the request packet;

determining, by the security system, based on the sequence ID, a type of the indirect memory access, wherein the type of the indirect memory access includes an indirect memory access type selected from a write access type and a read access type;

validating, by the security system, the type of the indirect memory access based on the security attribute and the request packet; and when the type of the indirect memory access is successfully validated,
    identifying, by a memory controller of the IC, the instruction sequence associated with the indirect memory access based on the request packet, and
    executing, by the memory controller, the instruction sequence on the memory, thereby facilitating the indirect memory access for the functional circuit.

17. The method of claim 16, wherein the validation of the functional circuit comprises:

comparing, by the security system, the security attribute with a set of security levels associated with authorized access of the memory; and comparing, by the security system, the functional ID with a set of functional IDs associated with the authorized access of the memory, wherein the functional circuit is validated based on (i) a match between the security attribute and one of the set of security levels and (ii) a match between the functional ID and one of the set of functional IDs.

18. The method of claim 16, further comprising receiving, by the security system, a privilege attribute indicative of a privilege level of the functional circuit, wherein the type of the indirect memory access is validated by the security system further based on the privilege attribute.

19. The method of claim 18, wherein various memory addresses of the memory are divided into a plurality of address ranges, each address range includes one or more memory addresses associated with the memory, and the validation of the type of the indirect memory access comprises:

determining, by the security system, a plurality of addresses associated with the indirect memory access, wherein the request packet comprises a start address and a data size associated with the indirect memory access, and wherein the plurality of addresses is determined based on the start address and the data size;

determining, by the security system, whether one of a plurality of address ranges comprises the plurality of addresses, wherein the plurality of address ranges is mapped to a plurality of policy values, and each policy value of the plurality of policy values indicates at least one indirect memory access type selected from the write access type and the read access type;

identifying, by the security system from the plurality of policy values, based on the determination that a first address range of the plurality of address ranges comprises the plurality of addresses, a first policy value associated with the first address range;

determining, by the security system, a set of indirect memory access types authorized for the functional circuit based at least on the first policy value; and comparing, by the security system, the type of the indirect memory access with the set of indirect memory access types to validate the type of the indirect memory access.

* * * * *